(12) United States Patent
Miles (10) Patent No.: US 8,549,052 B2
(45) Date of Patent: Oct. 1, 2013

(54) SECURITY EVENT UPDATE PROTOCOL (75) Inventor: Russell William Miles, St. Petersburg, FL (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 599 days.

(21) Appl. No.: 11/962,773

(22) Filed: Dec. 21, 2007

(65) Prior Publication Data

US 2009/0164483 A1    Jun. 25, 2009

(51) Int. Cl.
*G06F 15/16* (2006.01)
*G06F 17/30* (2006.01)

(52) U.S. Cl.
USPC .......................................................... 707/899

(58) Field of Classification Search
USPC ................... 348/61; 340/502, 539.11, 573.1; 707/2, 6, 8, 204, 781, 899; 709/223
See application file for complete search history.

(56) References Cited

U.S. PATENT DOCUMENTS

| | | | | |
|---|---|---|---|---|
| 4,581,605 A * | 4/1986 | Vogt | | 340/525 |
| 5,086,385 A * | 2/1992 | Launey et al. | | 700/83 |
| 6,229,429 B1 * | 5/2001 | Horon | | 340/286.01 |
| 6,294,993 B1 * | 9/2001 | Calaman | | 340/539.18 |
| 6,404,880 B1 * | 6/2002 | Stevens | | 379/221.11 |
| 6,697,810 B2 * | 2/2004 | Kumar et al. | | 707/10 |
| 6,917,902 B2 * | 7/2005 | Alexander | | 702/189 |
| 6,965,313 B1 | 11/2005 | Saylor et al. | | |
| 7,113,090 B1 | 9/2006 | Saylor et al. | | |
| 7,489,237 B2 * | 2/2009 | Fisher et al. | | 340/506 |
| 7,970,946 B1 * | 6/2011 | Djabarov et al. | | 709/248 |
| 2002/0143934 A1 * | 10/2002 | Barker et al. | | 709/224 |
| 2003/0163532 A1 * | 8/2003 | Kacalek et al. | | 709/206 |
| 2005/0138111 A1 * | 6/2005 | Aton et al. | | 709/201 |
| 2006/0001537 A1 * | 1/2006 | Blake et al. | | 340/521 |
| 2009/0070473 A1 | 3/2009 | Baum et al. | | |
| 2010/0023865 A1 | 1/2010 | Fulker et al. | | |

* cited by examiner

*Primary Examiner* — Jorge A Casanova
(74) *Attorney, Agent, or Firm* — MH2 Technology Law Group, LLP (57) ABSTRACT

Methods and computer-readable mediums are provided. For example, in one method a request is initiated for a security event update. Thereafter, a last received event identification ("LREI") for at least one event type is retrieved from memory and inserted a security event update request. The request is transmitted as a polling signal towards a device (e.g., a server or remote client). In another method, a request signal containing is received. An LREI for an event type is extracted from the request. The LREI is compared to an event identification stored in memory. The results are inserted into a response. An indication, is inserted into the response, that at least one event identification is greater than said LREI and is not inserted in the response. The response is transmitted. In yet other embodiments, the computer-readable mediums and systems are also provided which perform similar features recited by the above methods.

18 Claims, 7 Drawing Sheets

SECURITY EVENT UPDATE PROTOCOL

BACKGROUND OF THE INVENTION

1. Field of the Invention

Embodiments of the present invention generally relate to security systems and more particularly, to methods, computer-readable mediums, apparatuses, and systems for updating security event data.

2. Description of the Related Art

A dedicated security monitoring system can be used to manage different security subsystems (e.g., cameras, alarms, system maintenance) coupled to a building. The dedicated security monitoring system typically monitors the subsystems using a communications network coupling each of the subsystems. A user, through a remote device, accesses the information stored in the security monitoring system; and stores the data on the remote device. However, to insure that the remote device has new events, the remote device downloads all of the events from the security monitoring system. Transmitting all of the events each time an update or confirmation of the most recent data wastes resource (e.g., transmission bandwidth, processor bandwidth (i.e., of the security monitoring system and remote device), power, and time).

Programming languages are used to transmit information (e.g., Extensible Rights Markup Language ("XML") is used for the exchange of secure digital content). Markup languages are typically based on the Standard Generalized Markup Language ("SGML"). SGML is a standard language for defining the format in a text document that allows sharing of documents among computers, regardless of hardware and operating system configurations. Markup language files use a standard set of code tags embedded in text that describes the elements of a document. The XML parser interprets the code tags so that each computer having its own unique hardware and software capabilities is able to display the document while preserving the original format of the document.

Therefore, there is a great need in the art for an update protocol which that avoids the shortcomings and drawbacks (e.g., transmission of data already stored in a remote device) of prior art systems and methodologies.

SUMMARY OF THE INVENTION

The present invention generally relate to security systems and more particularly, to methods, computer-readable mediums, apparatuses, and systems for updating security event data.

For example, in one method a request is initiated for a security event update. Thereafter, a last received event identification ("LREI") for at least one event type is retrieved from memory and inserted into any programming language (e.g., extensible markup language ("XML")). The code (e.g., XML) is transmitted as a polling signal towards a device (e.g., a server or remote client).

In another method, a request signal containing is received. An LREI for an event type is extracted from the signal. The LREI is compared to an event identification stored in memory. The results are inserted into a Reply. An indication, is inserted into the Reply, that at least one event identification is greater than the LREI and is not inserted into the Reply. Thereafter the Reply is transmitted.

Other embodiments are also provided in which computer-readable mediums, apparatuses and systems perform similar features recited by the above methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

In the following description, numerous specific details are set forth to provide a more thorough understanding of the invention. As will be apparent to those skilled in the art, however, various changes using different configurations may be made without departing from the scope of the invention. One of the technical effects of this disclosure is a reduction in transmission of duplicative security data. In other instances, well-known features have not been described in order to avoid obscuring the invention. Thus, the invention is not considered limited to the particular illustrative embodiments shown in the specification and all such alternate embodiments are intended to be included in the scope of this invention.

For illustrative purposes only, the aspects of this disclosure have been depicted and described using extensible markup language ("XML"). However, those depictions and descriptions are not intended to in any way to limit the scope of the invention. For example, event(s), event type(s), and last received event identifications ("LREI's) are described as being inserted into XML. However, in accordance with aspects of the invention, events, event types, and LREI's can be inserted into other types of code (e.g., C, Fortran, etc.).

Figure 1:
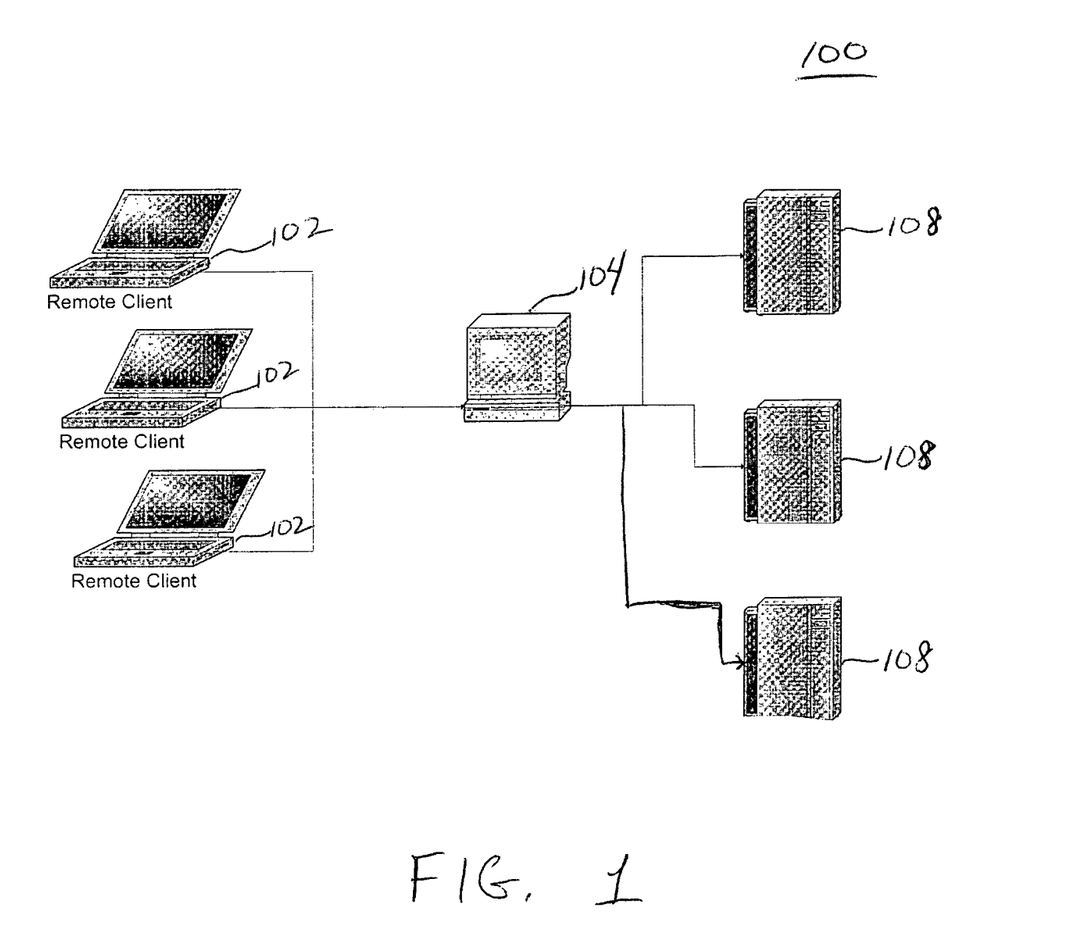
FIG. 1 depicts a block diagram of an embodiment of a system in accordance with aspects disclosed herein.

FIG. 1 depicts a block diagram of an embodiment of a system 100 in accordance with aspects disclosed herein. The system 100 includes a server 104, at least one security event sensor 108, and a least one remote client 102.

Each of the security event sensors 108 locally monitors for the occurrence of events (e.g., door alarms, fire alarms, video surveillance). Upon the occurrence of an event, the security event sensors 108 transmit event data towards the server 104. The event data includes, but is not limited to, an event type and other data associated with the event. The server 104 stores the event and event type; and associates an event identification with the event. Specifically, each time an event occurs, a unique, increased (with each successive event), and ordered identifier (i.e., the event identification) is assigned and associated to the event. For example, in some embodiments, the event identification is a timestamp (note that the timestamp satisfies the above three criteria and that each timestamp only identifies a different event).

In other embodiments, the event identification is a unique sequential number that satisfies the above criteria (e.g., 1, 2, 3, 4, etc. or 2, 4, 6, 8, 10, etc.).

For illustrative purposes only, aspects of this disclosure describe communication between the remote client 102 and server 104 to update security events stored in the remote client 102. However, it is appreciated that the remote client 102 can communicate with and receive updates from another remote client 102. The remote clients update each other using other forms of communication (e.g., Bluetooth, Infrared, Wi-Fi, etc.) when needed (e.g., when the server 104 is not reachable).

Figure 2:
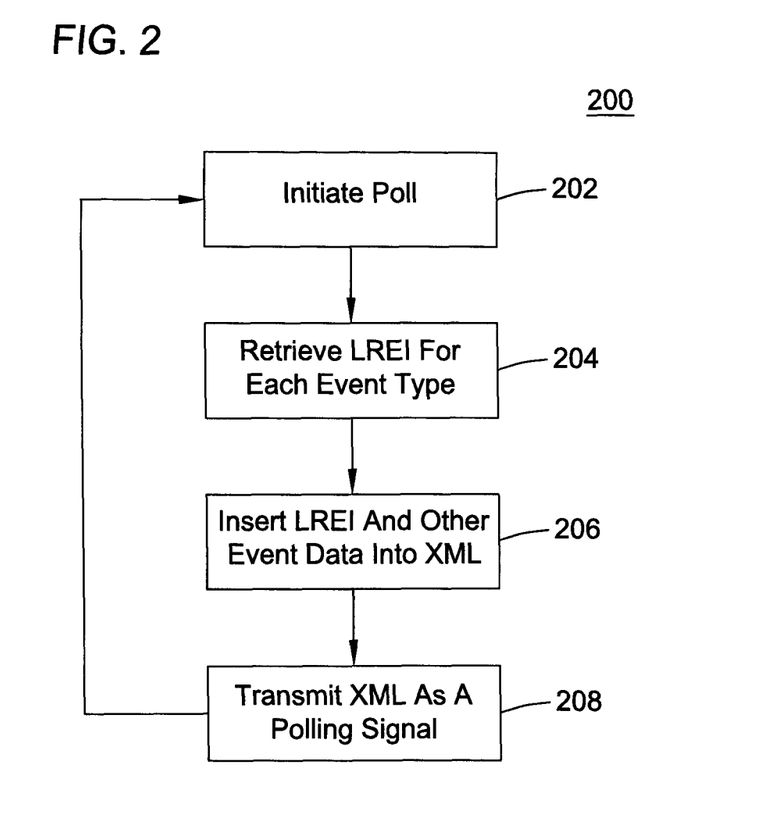
FIG. 2 depicts an embodiment of an exemplary method in accordance with aspects of this disclosure.

FIG. 2 depicts an embodiment of an exemplary method 200 in accordance with aspects of this disclosure. The method 200 generates and transmits a polling signal. At step 202, generation of the polling signal is initiated in preparation for transmission. Thereafter, the polling signal is retransmitted in response to an occurrence of an event(s) (e.g., the passage of time). For example, the polling signal is retransmitted at periodic time intervals (e.g., every 5 seconds or every 10 seconds). The duration of the time intervals can be preset or an end user can configure the duration of the time intervals. In addition, the polling signal can be transmitted when existing polling data is erased. After initiation of the method 200, the method 200 proceeds to step 204.

At step 204 an events list is retrieved. Last received event identifications ("LREIs") are counters stored in memory (e.g., in a look-up table) of the remote client 102. The LREI for each event type represents the last event received, by the remote client 102, for that event type. In various embodiments, the LREI information stored in the remote client 102 includes such information as, but not limited to, the type of LREI (e.g., an Alarm event, a Disable function event, a Monitor event, a Supervisory event, a Trouble event, a Security event, and a Normal event); a maximum number of events allowed in a response to a polling signal LREI; and a priority status associated with each type of event.

As used herein, an "Alarm Event" is generally defined as a detection of a fire. As used herein, a "Security Event" is generally defined as a detection of motion. As used herein, a "Supervisory Event" is generally defined as a problem or condition (e.g., improper operation of a valve) with a security system. As used herein, a "Disabled Event" is generally defined as a disabling of an event sensor. As used herein, a "Trouble Event" is generally defined as a malfunction of an element/component in the security system. As used herein, a "Monitor Event" is generally defined as process management or other non-life threatening event. As used herein, a "Normal Event" is generally defined as an indication that the condition, which triggered a non-Normal Event is no longer present.

In various embodiments, priority status for events types are as follows: the "Alarm Event" has a priority of "1;" the "Security Event" has a priority of "2;" the "Supervisory Event" has a priority of "3;" the "Disabled Event" has a priority of "4;" the "Trouble Event" has a priority of "5;" the "Monitor Event" has a priority of "6;" and the "Normal Event" has a priority of "7." In various embodiments, the remote client 102 transmits the priority status in the requests (i.e., the polling signals). In other embodiments, the priority status of the events is implied by the order of the event types in the requests.

Although the material disclosed herein is described using the above event types it is appreciated that more or less event types; and/or other event types can be used in accordance with this disclosure.

In other embodiments, a maximum number of events allowed for an event type is transmitted in the polling signal.

In yet other embodiments, the order of the event types in the polling signal provides the priority status of the event types in the response.

The priority status determines the order upon which updated LREI information is transmitted from the server 104 towards the remote client. For example, event types can be given priority status indicators of 1, 2, 3, 4, 5, etc. The lower the priority status indicator the higher the priority of that event type. For example, if the "Alarm" event has a priority status of "1" and the "Security" event of "3" then the Alarm event has a higher priority and will be inserted into the Reply first. Specifically, the server 104 places the highest priority events (i.e. Alarm) in the Reply first, then the second priority, etc. If the Reply becomes "full" (i.e., the maximum number of events for the Reply has been reached), a "More Events Flag" is set and the Reply message is sent. For example, if Alarm events have the highest priority, Alarm events are inserted into the Reply and thereafter; the type of events having the next highest priority is inserted into the Reply, etc (until the Reply is filled to capacity as determined by the maximum number of events allowed). One of the benefits associated with the maximum number of events allowed is that there are instances when transmission bandwidth and/or storage capacity is limited. For example, when the remote client 102 is a personal digital assistant ("PDA") bandwidth and/or storage capacity are limited.

In various embodiments, the retrieved list includes each of the LREI's stored in the remote client 102.

In other embodiments, the retrieved list includes at least one of the LREI's stored in the remote client 102. For example, a user can select which event type(s) stored in the remote client 102 is retrieved in the list.

After the LREI information is retrieved, the method 200 proceeds to step 206. At step 206 the retrieved list is inserted (i.e., into extensible markup language ("XML")) into the polling signal. Tables 1 and 2, below, provide exemplary XML polling signals. Table 1 is exemplary XML code transmitted in an initial polling signal (i.e., a Request) when the remote client 102 has no events for the event types stored (i.e., stored in memory). As such, the LREI's for each of the event types is set to "0" (e.g., "lastAlarmLREI" is set to "0").

TABLE 1

```
**************************************************************
<?xml version="1.0" encoding="utf-8"?>
<soap:Envelope xmlns:soap="http://schemas.xmlsoap.org/soap/envelope/"
  xmlns:xsi="http://www.w3.org/2001/XMLSchema-instance"
  xmlns:xsd="http://www.w3.org/2001/XMLSchema">
  <soap:Body>
    <PollUnit xmlns="http://tempuri.org/">
      <lastAlarmLREI>0</lastAlarmLREI>
      <lastDisableLREI>0</lastDisableLREI>
      <lastMonitorLREI>0</lastMonitorLREI>
      <lastSupivisoryLREI>0</lastSupivisoryLREI>
      <lastTroubleLREI>0</lastTroubleLREI>
      <lastSecurityLREI>0</lastSecurityLREI>
      <lastNormalLREI>0</lastNormalLREI>
      <maxDeltas>100</maxDeltas>
    </PollUnit>
  </soap:Body>
</soap:Envelope>
**************************************************************
```

After a Reply has been sent, by the server 104, in response to the Request, by the remote client 102, the remote client 102 periodically sends subsequent Requests. Table 2 (provided below) includes exemplary XML code representing a subsequent Request. Note that in Table 2, some of the LREI's have non-zero values (e.g., the "lastAlarmLREI" has an LREI of 24).

TABLE 2

```
******************************************************************
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema">
    <soap:Body>
        <PollUnit xmlns="http://tempuri.org/">
            <lastAlarmLREI>24</lastAlarmLREI>
            <lastDisableLREI>10</lastDisableLREI>
            <lastMonitorLREI>0</lastMonitorLREI>
            <lastSupivisoryLREI>18</lastSupivisoryLREI>
            <lastTroubleLREI>21</lastTroubleLREI>
            <lastSecurityLREI>0</lastSecurityLREI>
            <lastNormalLREI>26</lastNormalLREI>
            <maxDeltas>100</maxDeltas>
        </PollUnit>
    </soap:Body>
</soap:Envelope>
******************************************************************
```

After conversion into XML, the method 200 proceeds to step 208. At step 208, the polling signal is transmitted (using internet web services (e.g., http, https, and the like)) towards the server 104. The polling signal is transmitted towards the server 104 to query whether new events (i.e., events not stored in the remote client 102) are stored in the server 104. For example, the new events can be security events or fire events that have occurred since the previous poll (if there is a prior poll). After step 208, the method 200 proceeds to step 202. At step 202, the method 200 proceeds as explained above.

Figure 3:
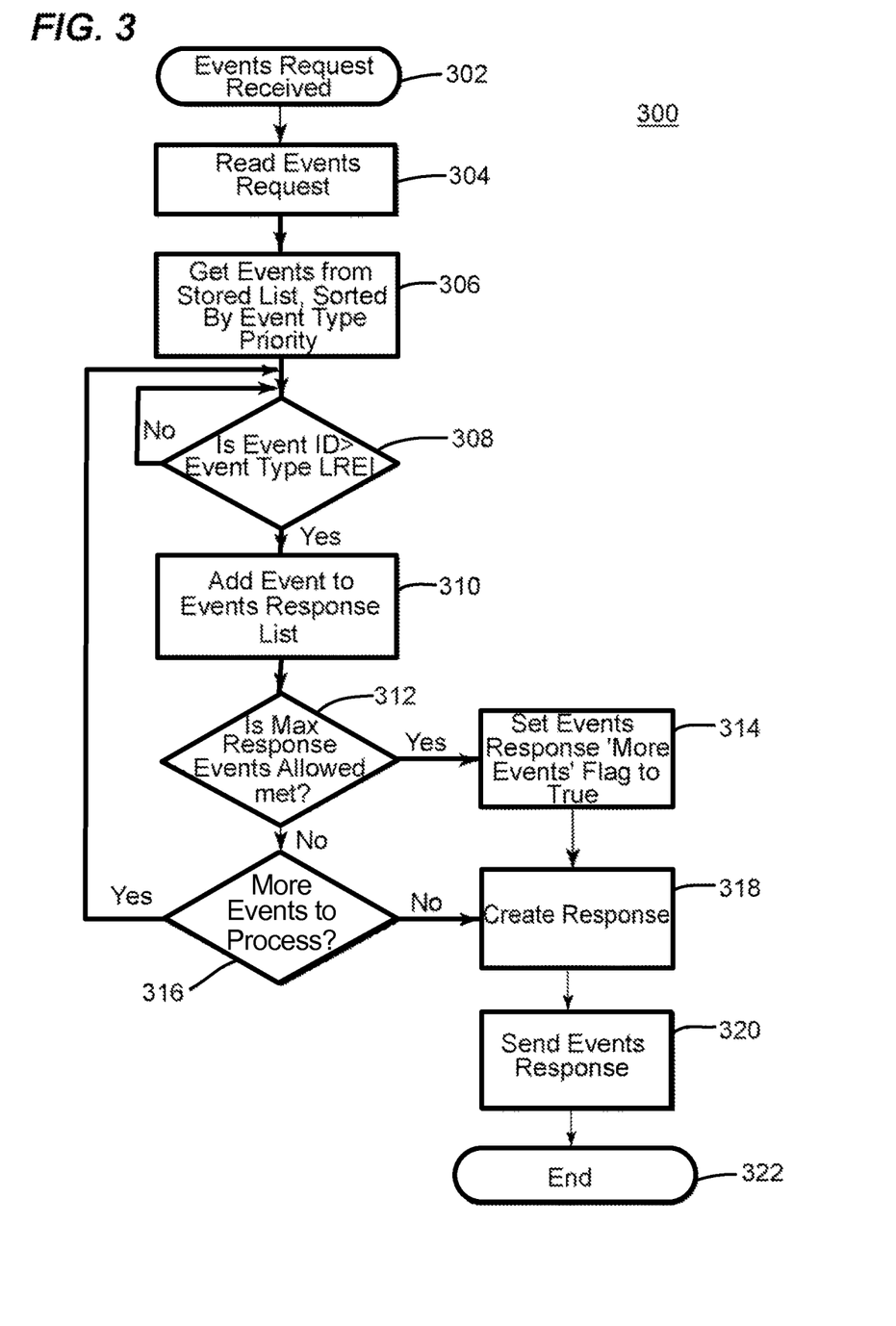
FIG. 3 depicts an exemplary method used in accordance with aspects of this disclosure.

FIG. 3 depicts an exemplary method 300 used in accordance with aspects of this disclosure. The method 300 begins at step 302 when the server 104 receives the polling signal. Thereafter, the method proceeds to step 304.

At step 304, the server 104 reads the polling signal and extracts (in various embodiments) the event type(s), LREI(s), a priority level associated with each event type, and the maximum event(s) allowed in a Reply. In other embodiments, the maximum number of events varies from event type to event type. Thereafter, the method 300 proceeds to step 306.

At step 306, the server 104 retrieves the event type(s) from memory that were extracted in step 304. The event types are retrieved in the order of priority extracted from the polling signal. Thereafter, the method 300 proceeds to step 308.

At step 308, the method 300 queries whether the event identification (stored in the server 104) is greater than the LREI (transmitted by the remote client 102). For example, the extracted information includes an Alarm event having an LREI of 40. In the server 104, the latest Alarm event type has an event identification of 70 stored in the memory of the server 104. In this example, the query at step 308 is answered affirmatively and proceeds to step 310. If however, the query at step 308 is answered negatively step 308 is repeated for a comparison of the next LREI to the next event stored in the server 104.

At step 310, the event identification (e.g., event identification 70) for the Alarm event type is inserted into the Reply (e.g., in XML). Thereafter, the method 300 proceeds to step 312.

At step 312, the method 300 queries whether the maximum number of events is the same as the number of events inserted in the Reply. Step 312 acts as an iterative counter. If the query is answered negatively, the method 300 proceeds to step 316.

At step 316, the method 300 queries whether there are more events in the server 104. If the query is answered affirmatively, the method 300 proceeds to step 308 and operates as explained above. If however, a negative determination is made at step 316, the method 300 proceeds to step 318 (explained below).

Returning to step 312, if an affirmative determination is made at step 312 the method 300 proceeds to step 314. Because the number of new events (i.e., events which occur later than the LREI for the event types) exceeds the maximum number of events allowed the Reply, a "More Events Flag" is set to true. Thereafter, the method 300 proceeds to step 318.

At step 318, events are inserted in the Reply (in the order of event type priority). Thereafter, the method 300 proceeds to step 320.

At step 320, the Reply (e.g., in XML) is transmitted towards the remote client 102. Thereafter, the method 300 proceeds to and ends at step 322.

Figure 4:
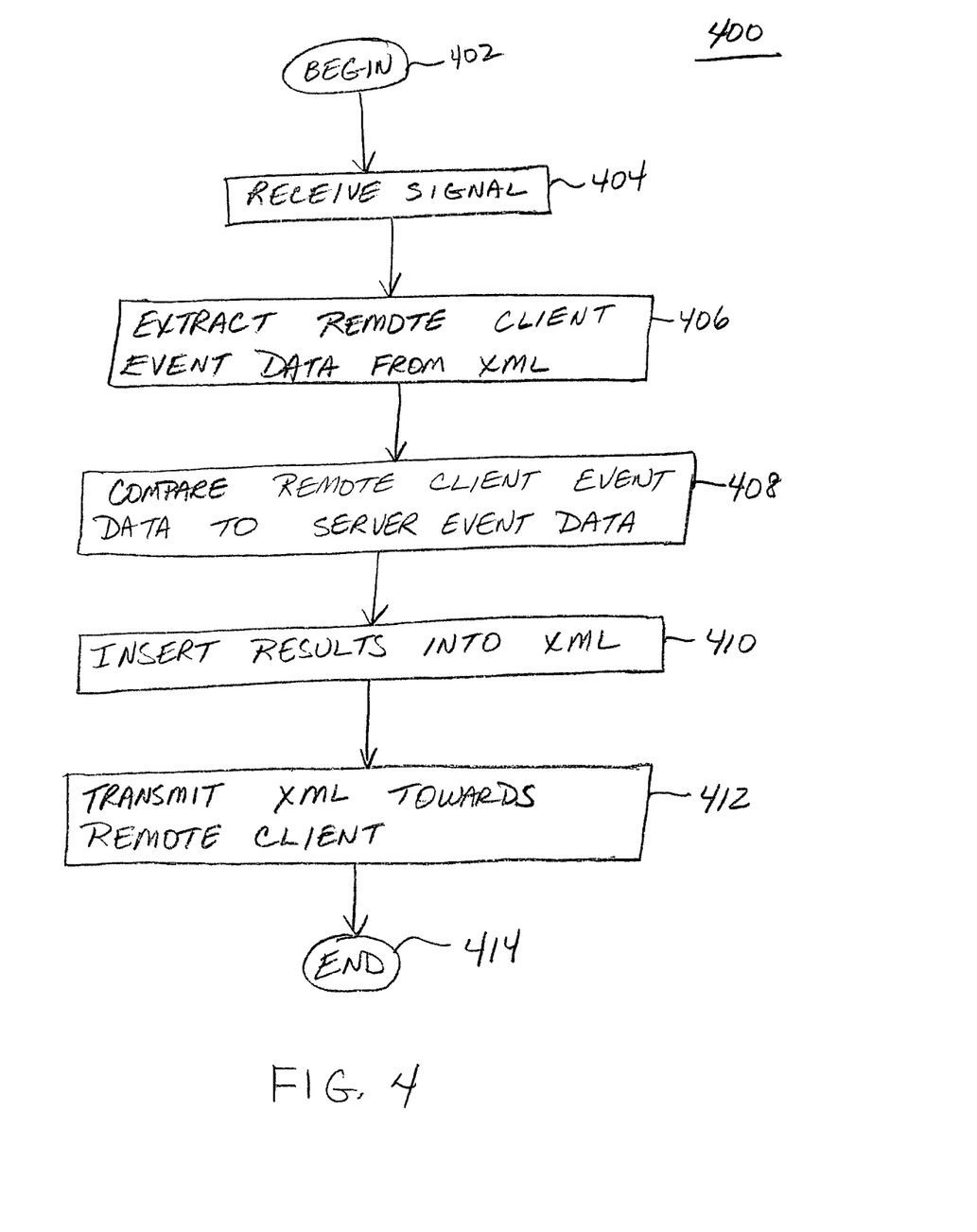
FIG. 4 depicts an exemplary method used in accordance with aspects of this disclosure.

FIG. 4 depicts an exemplary method 400 used in accordance with aspects of this disclosure. The method 400 begins at step 402 and proceeds to step 404.

At step 404 a server 104 receives a polling signal. The polling signal includes, but is not limited to, at least one event type, a maximum response allowed for each event type, an LREI for each event type, and a priority for each event type. After receipt of the signal, the method 400 proceeds to step 406.

At step 406, the event type(s), the LREI associated with each event type, the maximum response allowed for each event type, and the priority level associated with each event type is extracted from the polling signal. After extraction, the method 400 proceeds to step 408.

At step 408, the server 104 compares the extracted data (i.e., the remote client event data) to the event data stored in the server 104. For example, for each event type extracted, the event identification is compared to the LREI. If the event identification is greater than the LREI then the event identification is regarded as new data. After comparison, the method 400 proceeds to step 410.

At step 410, the method 400 inserts the results of the comparison into a Reply (e.g., in XML). In certain instances, the resources of the remote client 102 are limited. For example, a PDA has limited memory and processing power. Accordingly, the maximum response allowed for each event type limits the number of events that are inserted into XML. When there are new events that exceed the allowed maximum, a flag can be set to indicate such and is also inserted into XML. After the results of the comparison are inserted into the XML, the method 400 proceeds to step 412.

At step 412, the XML is transmitted towards the remote client 102. After transmission, the method 400 proceeds to and ends at step 414.

For exemplary purposes Tables 3 and 4 are presented below. Table 3 represents an exemplary reply by the server 104 to the exemplary polling signal transmitted, in Table 1, by the remote client 102. Note that the event data transmitted in the initial Reply (in Table 3), conforms (i.e., updated the data stored in the remote client 102) to the event data transmitted in the subsequent Request found in Table 2.

TABLE 3

```
******************************************************************
<?xml version="1.0" encoding="utf-8"?>
<soap:Envelope xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema">
    <soap:Body>
        <PollUnitResponse xmlns="http://tempuri.org/">
            <MoreData>false</MoreData>
            <PollUnitResult>
                <DeltaEventsTable>
                    <EventId>2</EventId>
                    <StateName>Alarm: Smoke Activate</StateName>
```

TABLE 3-continued

```
        <EventType>Alarm</EventType>
      </DeltaEventsTable>
      <DeltaEventsTable>
        <EventId>4</EventId>
        <StateName>Alarm: Pull Activate</StateName>
        <EventType>Alarm</EventType>
      </DeltaEventsTable>
      <DeltaEventsTable>
        <EventId>6</EventId>
        <StateName>Alarm: Pull Activation Ack</StateName>
        <EventType>Alarm</EventType>
      </DeltaEventsTable>
      <DeltaEventsTable>
        <EventId>7</EventId>
        <StateName>Alarm: Smoke Activation Ack</StateName>
        <EventType>Alarm</EventType>
      </DeltaEventsTable>
      <DeltaEventsTable>
        <EventId>11</EventId>
        <StateName>Alarm: Smoke Restore</StateName>
        <EventType>Alarm</EventType>
      </DeltaEventsTable>
      <DeltaEventsTable>
        <EventId>12</EventId>
        <StateName>Alarm: Pull Restore</StateName>
        <EventType>Alarm</EventType>
      </DeltaEventsTable>
      <DeltaEventsTable>
        <EventId>15</EventId>
        <StateName>Alarm: Smoke Restoration Ack</StateName>
        <EventType>Alarm</EventType>
      </DeltaEventsTable>
      <DeltaEventsTable>
        <EventId>24</EventId>
        <StateName>Alarm: Pull Restoration Ack</StateName>
        <EventType>Alarm</EventType>
      </DeltaEventsTable>
      <DeltaEventsTable>
        <EventId>3</EventId>
        <StateName>Supervisory: Supervisory Activate</StateName>
        <EventType>Supervisory</EventType>
      </DeltaEventsTable>
      <DeltaEventsTable>
        <EventId>8</EventId>
        <StateName>Supervisory: Supervisory Activation Ack</StateName>
        <EventType>Supervisory</EventType>
      </DeltaEventsTable>
      <DeltaEventsTable>
        <EventId>13</EventId>
        <StateName>Supervisory: Supervisory Restore</StateName>
        <EventType>Supervisory</EventType>
      </DeltaEventsTable>
      <DeltaEventsTable>
        <EventId>18</EventId>
        <StateName>Supervisory: Supervisory Restoration Ack</StateName>
        <EventType>Supervisory</EventType>
      </DeltaEventsTable>
      <DeltaEventsTable>
        <EventId>1</EventId>
        <StateName>Partition Disarmed Activate</StateName>
        <EventType>Disabled</EventType>
      </DeltaEventsTable>
      <DeltaEventsTable>
        <EventId>10</EventId>
        <StateName>Partition Disarmed Activation Ack</StateName>
        <EventType>Disabled</EventType>
      </DeltaEventsTable>
      <DeltaEventsTable>
        <EventId>5</EventId>
        <StateName>Trouble: Local Trouble Activate</StateName>
        <EventType>Trouble</EventType>
      </DeltaEventsTable>
```

TABLE 3-continued

```
      <DeltaEventsTable>
        <EventId>9</EventId>
        <StateName>Trouble: Local Trouble Activation Ack</StateName>
        <EventType>Trouble</EventType>
      </DeltaEventsTable>
      <DeltaEventsTable>
        <EventId>14</EventId>
        <StateName>Trouble: Local Trouble Restore</StateName>
        <EventType>Trouble</EventType>
      </DeltaEventsTable>
      <DeltaEventsTable>
        <EventId>21</EventId>
        <StateName>Trouble: Local Trouble Restoration Ack</StateName>
        <EventType>Trouble</EventType>
      </DeltaEventsTable>
      <DeltaEventsTable>
        <EventId>16</EventId>
        <UnitDeltaId>2</UnitDeltaId>
        <EventType>Normal</EventType>
      </DeltaEventsTable>
      <DeltaEventsTable>
        <EventId>17</EventId>
        <UnitDeltaId>6</UnitDeltaId>
        <EventType>Normal</EventType>
      </DeltaEventsTable>
      <DeltaEventsTable>
        <EventId>19</EventId>
        <UnitDeltaId>3</UnitDeltaId>
        <EventType>Normal</EventType>
      </DeltaEventsTable>
      <DeltaEventsTable>
        <EventId>20</EventId>
        <UnitDeltaId>8</UnitDeltaId>
        <EventType>Normal</EventType>
      </DeltaEventsTable>
      <DeltaEventsTable>
        <EventId>22</EventId>
        <UnitDeltaId>5</UnitDeltaId>
        <EventType>Normal</EventType>
      </DeltaEventsTable>
      <DeltaEventsTable>
        <EventId>23</EventId>
        <UnitDeltaId>9</UnitDeltaId>
        <EventType>Normal</EventType>
      </DeltaEventsTable>
      <DeltaEventsTable>
        <EventId>25</EventId>
        <UnitDeltaId>4</UnitDeltaId>
        <EventType>Normal</EventType>
      </DeltaEventsTable>
      <DeltaEventsTable>
        <EventId>26</EventId>
        <UnitDeltaId>7</UnitDeltaId>
        <EventType>Normal</EventType>
      </DeltaEventsTable>
    </PollUnitResult>
  </PollUnitResponse>
 </soap:Body>
</soap:Envelope>
*************************************************************
```

An exemplary Reply to the subsequent polling signal (i.e., a reply to the polling signal transmitted in Table 2) is provided below.

TABLE 4

```
*************************************************************
<?xml version="1.0" encoding="utf-8"?>
<soap:Envelope xmlns:soap="http://schemas.xmlsoap.org/soap/envelope/"
 xmlns:xsi="http://www.w3.org/2001/XMLSchema-instance"
 xmlns:xsd="http://www.w3.org/2001/XMLSchema">
  <soap:Body>
    <PollUnitResponse xmlns="http://tempuri.org/">
      <MoreData>false</MoreData>
```

TABLE 4-continued

```
      </PollUnitResponse>
   </soap:Body>
</soap:Envelope>
*****************************************************************
```

Figure 5:
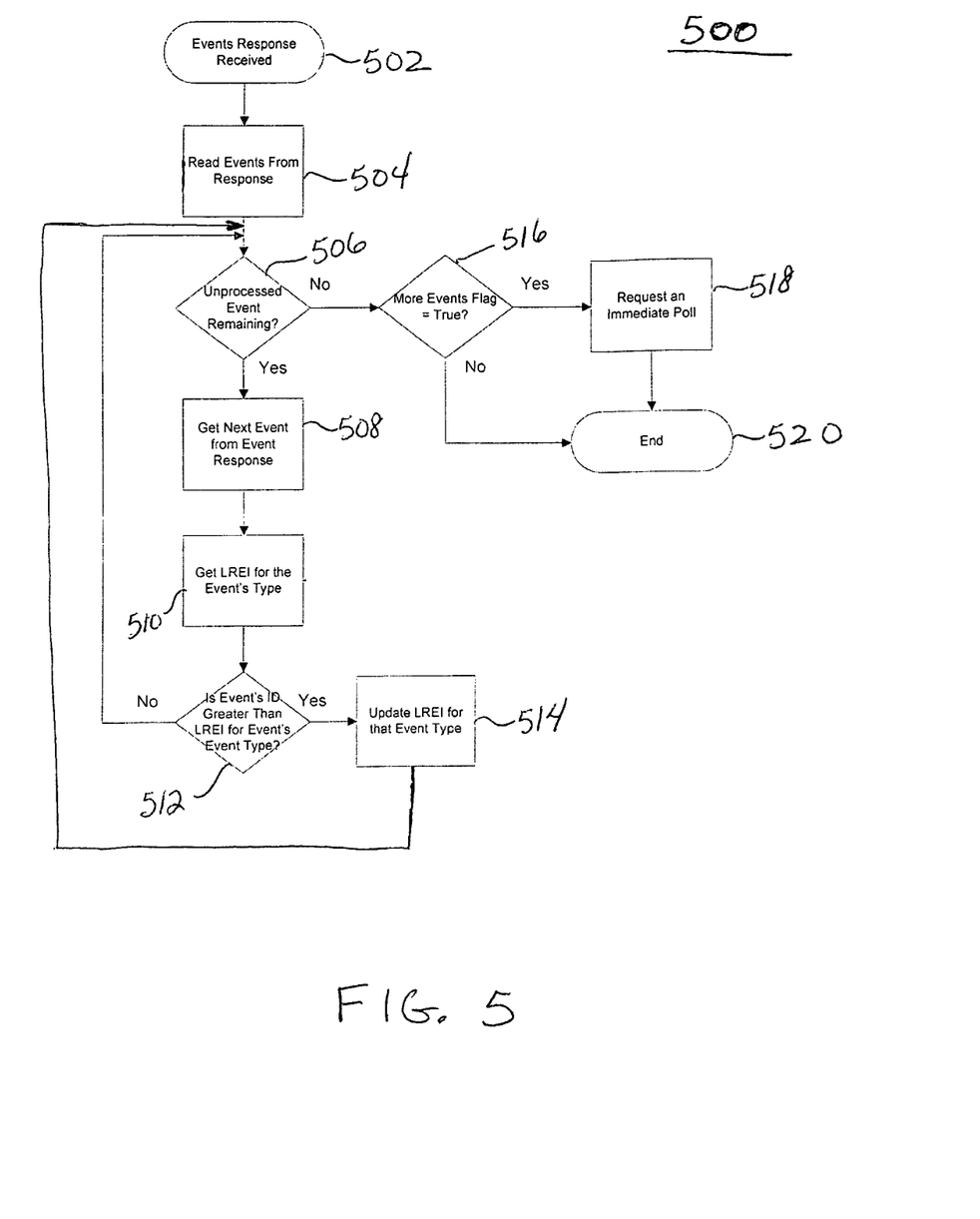
FIG. 5 depicts an exemplary method used in accordance with aspects of this disclosure.

FIG. 5 depicts an exemplary method 500 used in accordance with aspects of this disclosure. Method 500 is an exemplary method for retrieving updated event data. The method 500 begins at step 502 when a remote client 102 receives a security update signal (e.g., a reply to a polling signal). The security update signal includes in various embodiments such information as, but not limited to, the event data (e.g., event type(s), each event identification associated with the event type(s), and the status of the "More Events" flag). After receipt of the signal, the method 500 proceeds to step 504.

At step 504, the remote client 102 reads the reply signal. Thereafter, the method 500 proceeds to step 506.

At step 506, a determination is made whether there are any unprocessed events. If the determination, at step 506, the method proceeds to step 516.

At step 516, the More Events Flag is examined to determine if the flag indicates that more events were located in the server 104 and not transmitted to the remote client 102. If the determination at step 516 is answered negatively, the method 500 proceeds to and ends at step 520. If however, the determination at step 516 is answered affirmatively, the method 500 proceeds to step 518.

At step 518, an instruction to create and transmit a polling signal is initiated. For example, at step 518, method 200 is initiated. After step 518, the method 500 proceeds to and ends at step 520.

Returning to step 506, if an affirmative determination is made a step 506, the method proceeds to step 508. At step 508, an event (having an event type and an event identification associated therewith) from the response is acquired. Thereafter, the method 500 proceeds to step 510.

At step 510, the LREI, for the same event type as the event type acquired in step 508, is retrieved from memory of the remote client 102. The remote client 102 has a list of event types and LREI's for each event type stored in internal memory. After retrieval of the event type and LREI, the method 500 proceeds to step 512.

At step 512, a determination is made whether the event identification for the event (acquired in step 508) is greater than the LREI for the event type (retrieved from the memory of the remote client 102). If an affirmative determination is made at step 512, the method 500 proceeds to step 514.

At step 514, the LREI for the event type is updated with the new event identification (i.e., new LREI). The new LREI replaces the old LREI and is stored in the memory of the remote client 102. Thereafter, the method 500 proceeds to 506 and operates as described above.

Figure 6:
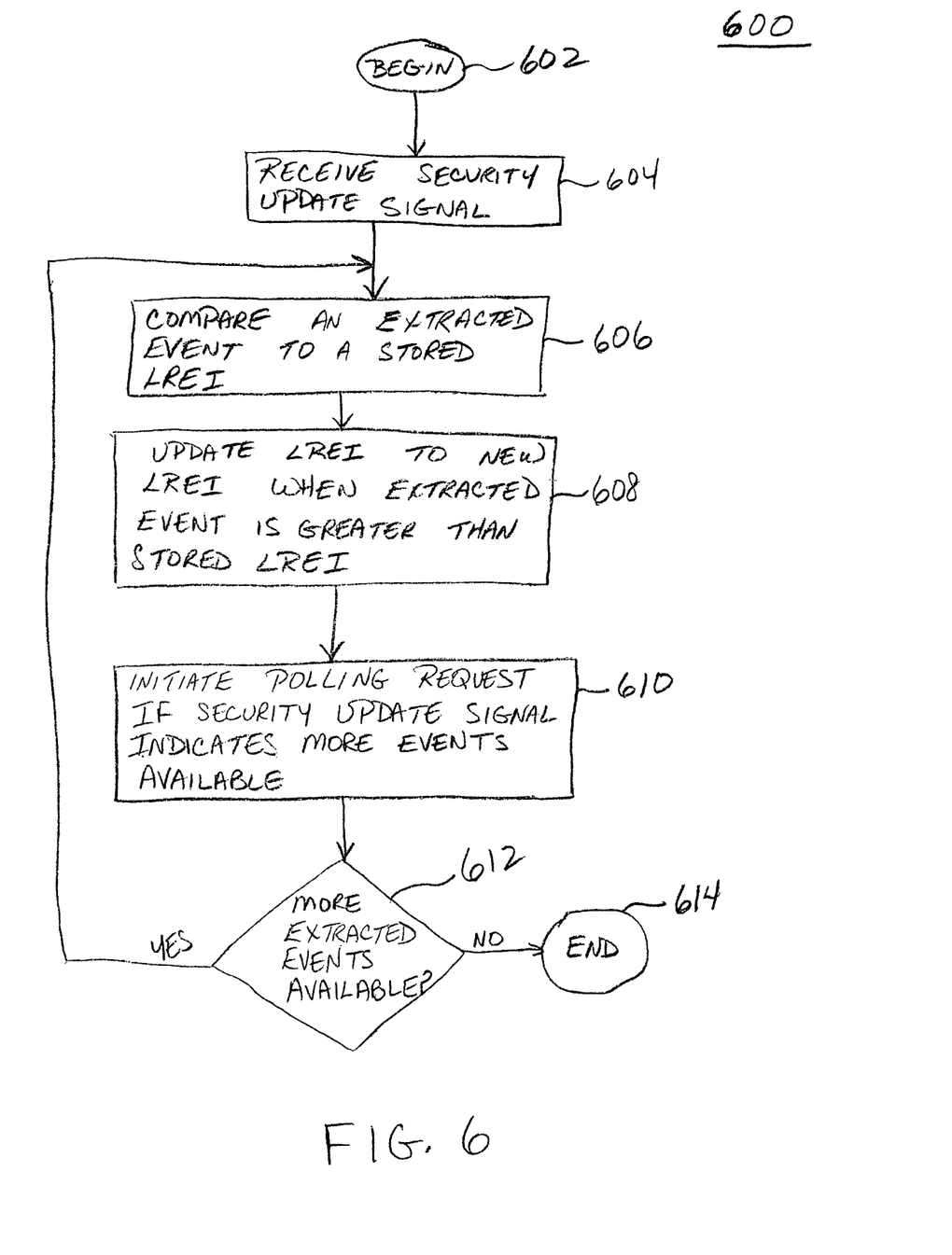
FIG. 6 depicts an exemplary method used in accordance with aspects of this disclosure.

FIG. 6 depicts an exemplary method 600 used in accordance with aspects of this disclosure. Method 600 begins at step 602 and proceeds to step 604.

At step 604, the remote client 102 receives a security update signal. The security update signal (e.g., in XML) contains security event data. Thereafter, the method 600 proceeds to step 606.

At step 606, an event is extracted from the Reply (illustratively described as using XML) and compared to the LREI (stored in the memory of the remote client 102) of the same event type as the extracted event. Thereafter, the method 600 proceeds to step 608.

At step 608, the event labeled as the new LREI for that event type is updated to the extracted event if the event identification for the extracted event is greater than the current LREI. Thereafter, the method 600 proceeds to step 610.

At step 610, a request for a polling signal is initiated if the received security signal indicates that there are events, which were not transmitted in the security update signal. For example, a "More Events Flag" is set to "true" to indicate that there are events, which exceed the maximum number of events allowed in a transmission. The More Events Flag is inserted into the Reply and transmitted in the security update signal with the rest of the event data. Thereafter the method 600 proceeds to step 612.

At step 612, the method 600 queries whether there are more events in the security update signal. If the query is answered negatively, the method 600 proceeds to and ends at step 614. If however, the query at step 612 is answered affirmatively, the method 600 proceeds to step 606 for comparison of the next extracted event.

Figure 7:
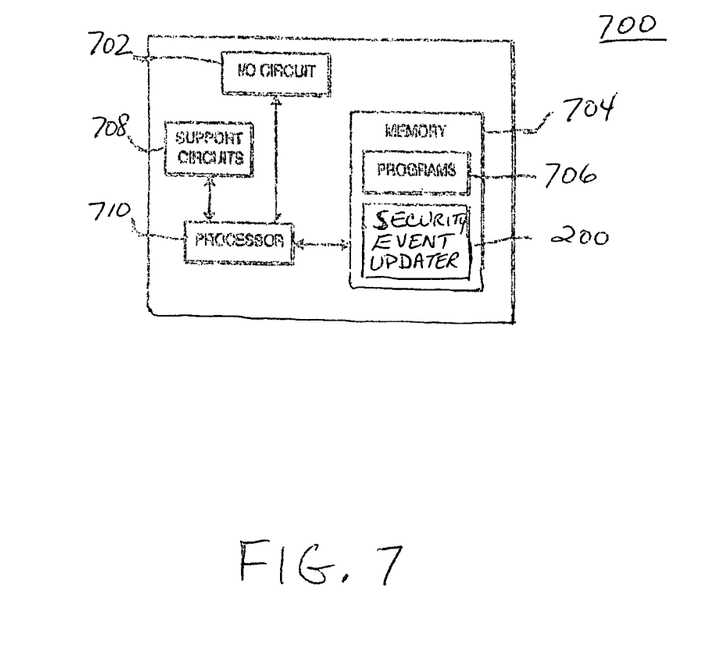
FIG. 7 depicts a high-level block diagram of a general-purpose computer architecture for performing an embodiment of the invention.

FIG. 7 depicts a high-level block diagram of a general-purpose computer architecture 700 for performing an embodiment of the invention. For example, the general-purpose computer 700 is suitable for use in performing the methods of FIGS. 2, 3, 4, 5, and/or 6. The general-purpose computer of FIG. 7 includes a processor 710 as well as a memory 704 for storing control programs and the like. In various embodiments, memory 704 also includes programs (e.g., depicted as a "valid data determinator" 1012) for performing the methods 200, 300, 400, 500, and/or 600. The processor 710 cooperates with conventional support circuitry 708 such as power supplies, clock circuits, cache memory and the like as well as circuits that assist in executing the software routines 706 stored in the memory 704. As such, it is contemplated that some of the process steps discussed herein as software processes may be loaded from a storage device (e.g., an optical drive, floppy drive, disk drive, etc.) and implemented within the memory 704 and operated by the processor 710. Thus, in various embodiments invention, can be stored on a computer readable medium. For example, any/all of the methods 200, 300, 400, 500, and/or 600 can be stored on computer-readable media as a plurality of instructions which, when executed by a processor, cause the processor the processor to perform any step (or steps) indicated in the methods 200, 300, 400, 500, and/or 600. The general-purpose computer 700 also contains input-output circuitry 702 that forms an interface between the various functional elements communicating with the general-purpose computer 700.

Although FIG. 7 depicts a general-purpose computer 700 that is programmed to perform various control functions in accordance with the present invention, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein. In addition, although one general-purpose computer 700 is depicted, that depiction is for brevity only. It is appreciated that the methods 200, 300, 400, 500, and/or 600 can be in separate computers.

While the foregoing is directed to embodiments of the present invention, other and further embodiments of the invention may be devised without departing from the basic scope thereof, and the scope thereof is determined by the claims that follow.

The invention claimed is:

1. A method comprising:
    initiating, at a remote client, a security event update request for a security system coupled to a building;
    retrieving, at the remote client, a stored last received event identification ("LREI") for an event type, wherein an event identification is a unique, increased, and ordered identifier that is assigned to and associated with an event when the event occurs, and wherein said LREI is the event identification associated with a last event received by the remote client for the event type;
    inserting said LREI for said event type into said security event update request; and
    transmitting said security event update request as a polling signal from the remote client towards a server.

2. The method of claim 1, wherein said security event update request comprises extensible markup language ("XML").

3. The method of claim 1, further comprising:
    receiving a reply at the remote client;
    extracting a security event from said reply;
    comparing the event identification associated with said extracted security event to said LREI;
    updating said LREI to the event identification associated with said extracted security event when the event identification associated with said extracted security event is greater than said LREI; and
    initiating a polling request from the remote client towards the server when said reply indicates that other events were not transmitted in said reply.

4. The method of claim 3, further comprising:
    repeating said extracting, said comparing, and said updating when more events are in said reply.

5. The method of claim 1, further comprising:
    receiving a reply at the remote client;
    extracting a first security event from said reply;
    updating said LREI with the event identification associated with said first security event;
    extracting a second security event from said reply;
    updating said LREI with the event identification associated with said second security event when the event identification associated with said second security event is greater than said LREI;
    initiating a polling request when said reply indicates that other events were not transmitted in said reply.

6. The method of claim 5, further comprising:
    extracting a third security event from said reply; and
    updating said LREI with the event identification associated with said third security event when the event identification associated with said third security event is greater than said LREI.

7. A method comprising:
    receiving, at a server, a security event update request signal for a security system that is coupled to a building;
    extracting a last received event identification ("LREI") from said request signal, wherein an event identification is a unique, increased and ordered identifier that is assigned to and associated with an event when the event occurs, and wherein said LREI is the event identification associated with a last event received by a remote client for an event type;
    comparing said LREI to an event identification associated with an event of the event type stored in memory at the server;
    inserting results of said comparison into a response when said event identification is greater than said LREI;
    inserting an indication in said response that more events of the event type exist, if at least one event identification associated with an event of the event type is greater than said LREI and is not transmitted in said response; and
    transmitting said response.

8. The method of claim 7, wherein said response is in extensible markup language ("XML").

9. The method of claim 7, wherein said indication is a flag.

10. A non-transitory computer-readable medium having stored thereon a plurality of instructions, the plurality of instructions including instructions which, when executed by a processor of a remote client, cause the processor to perform the steps comprising:
    initiating, at a remote client, a security event update request for a security system coupled to a building;
    retrieving, at the remote client, a stored last received event identification ("LREI") for an event type, wherein an event identification is a unique, increased, and ordered identifier that is assigned to and associated with an event when the event occurs, and wherein said LREI is the event identification associated with a last event received by the remote client for the event type;
    inserting said LREI for said event type into said security event update request; and
    transmitting said security event update request as a polling signal from the remote client towards a server.

11. The non-transitory computer-readable medium of claim 10, wherein said security event update request comprises extensible markup language ("XML").

12. The non-transitory computer-readable medium of claim 10, further comprising:
    receiving a reply at the remote client;
    extracting a security event from said reply;
    comparing the event identification associated with said extracted security event to said LREI;
    updating said LREI to the event identification associated with said extracted security event when the event identification associated with said extracted security event is greater than said LREI; and
    initiating a polling request from the remote client towards the server when said reply indicates that other events were not transmitted in said reply.

13. The non-transitory computer-readable medium of claim 10, further comprising:
    repeating said extracting, said comparing, and said updating when more events are in said reply.

14. The non-transitory computer-readable medium of claim 10, further comprising:
    receiving a reply at the remote client;
    extracting a first security event from said reply;
    updating said LREI with the event identification associated with said first security event;
    extracting a second security event from said reply;
    updating said LREI with the event identification associated with said second security event when the event identification associated with said second security event is greater than said LREI; and
    initiating a polling request when said reply indicates that other events were not transmitted in said reply.

15. The non-transitory computer-readable medium of claim 14, further comprising:
    extracting a third security event from said reply; and
    updating said LREI with the event identification associated with said third security event when the event identification associated with said third security event is greater than said LREI.

16. A non-transitory computer-readable medium having stored thereon a plurality of instructions, the plurality of instructions including instructions which, when executed by a processor of a server, cause the processor to perform the steps comprising:
    receiving, at the server, a security event update request signal for a security system that is coupled to a building;
    extracting a last received event identification ("LREI") for an event type from said request signal, wherein an event identification is a unique increased and order identifier that is assigned to and associated with an event when the event occurs, and wherein said LREI is the event identification associated with a last event received for an event type;
    comparing said LREI to an event identification associated with an event of the event type stored in memory at the server;
    inserting said results into a response when said event identification is greater than said LREI;
    inserting an indication in said response that more events of the event type exist, if at least one event identification associated with an event of the event type is greater than said LREI and is not transmitted in said response; and
    transmitting said response.

17. The non-transitory computer-readable medium of claim 16, wherein said indication is a flag.

18. The non-transitory computer-readable medium of claim 16, wherein said response comprises extensible markup language ("XML").

* * * * *